United States Patent Office 3,824,283
Patented July 16, 1974

---

3,824,283
UREA SYNTHESIS PROCESS
Shunichi Harada, Rego Park, and Maxim Karafian, Cold Spring Harbor, N.Y., assignors to Chemical Construction Corporation, New York, N.Y.
Filed Nov. 2, 1970, Ser. No. 85,952
Int. Cl. C07c *127/00*
U.S. Cl. 260—555 A          13 Claims

ABSTRACT OF THE DISCLOSURE

A urea synthesis process in which the pressure of the effluent melt from the urea synthesis autoclave is reduced to an intermediate level of 65 to 135 kg./sq. cm., and the off-gas evolved at this relatively high pressure is separated from the liquid effluent, which is then distilled to produce further high pressure off-gas. The off-gas streams of low water vapor content are combined and condensed, preferably by heat exchange with water which is vaporized to produce steam, and the process condensate is recycled to urea synthesis as recycle ammonium carbamate solution which is reacted with feed streams of ammonia and carbon dioxide at high pressure to synthesize urea and form the effluent melt. The residual liguid phase after high pressure distillation is passed at reduced pressure to further off-gas separation and distillation, and low pressure off-gas streams are combined and condensed to a liquid condensate which is pressurized and added to the combined high pressure off-gas stream or to the high pressure recycle ammonium carbamate solution.

BACKGROUND OF THE INVENTION

Field of the Invention

Figure 1:
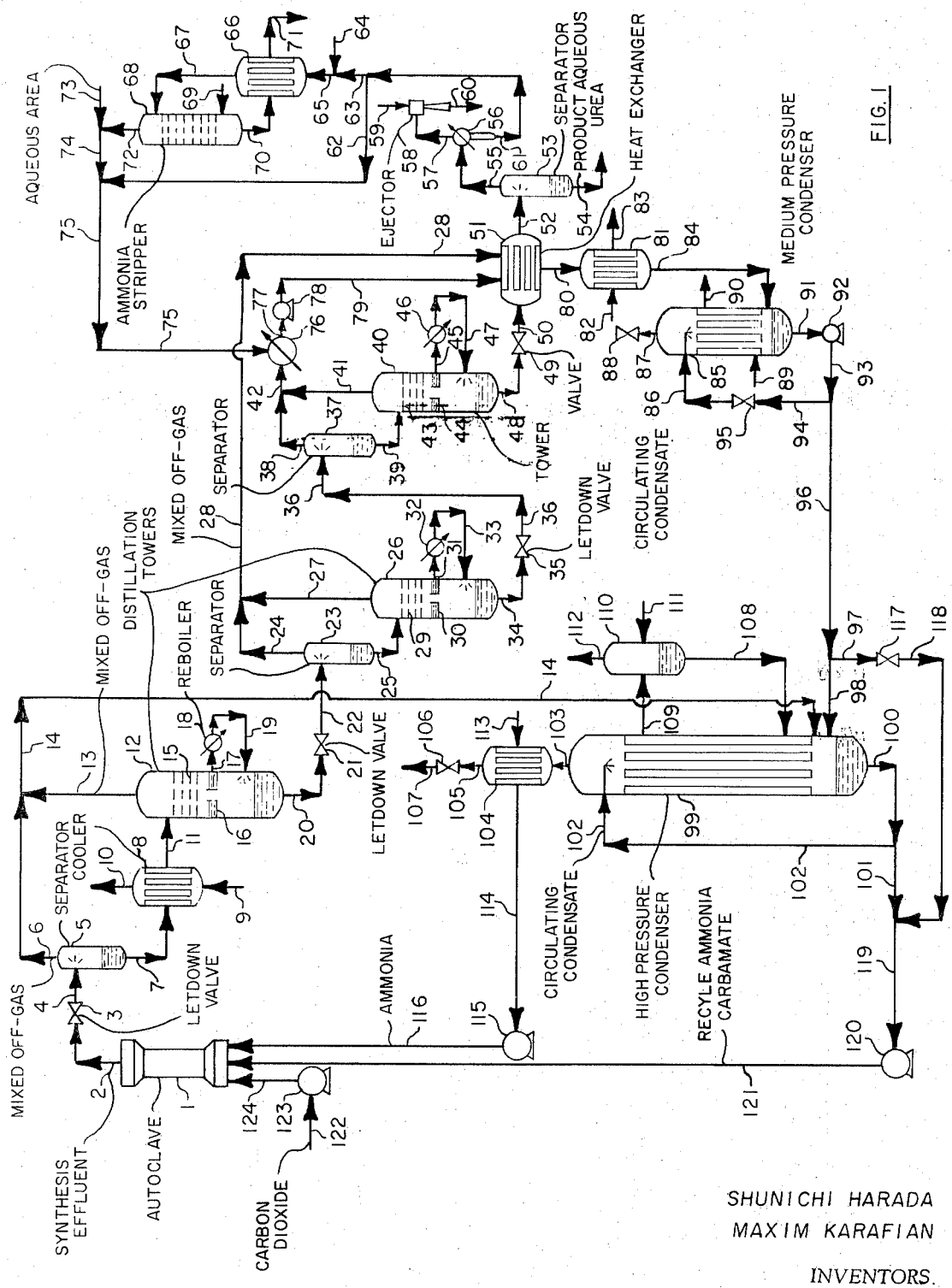

The invention relates to the high pressure synthesis of urea from ammonia and carbon dioxide, and recycle of unconverted components by generation of mixed off-gas at reduced pressure from the synthesis effluent melt, followed by condensation of mixed off-gas to form ammonium carbamate solution which is recycled to the high pressure synthesis.

Description of the Prior Art

Numerous liquid recycle processes of urea synthesis, which condense off-gas and recycle aqueous liquid ammonium carbamate solution to the urea synthesis autoclave, have been developed in the prior art. Among these may be mentioned the processes of U.S. Patent Applications Nos. 730,111 filed May 17, 1968, now U.S. Pat. No. 3,607,938; 759,371, filed Sept. 12, 1968, now U.S. Pat. No. 3,636,106; and 851,327, filed Aug. 19, 1969; now U.S. Pat. No. 3,668,250; and U.S. Pats. Nos. 3,527,799; 3,371,115; 3,354,205; 3,270,050; 3,258,486; 3,191,916; 3,172,911; 3,155,723; 3,155,722; 3,137,725; 3,091,637 and 3,069,234. Condensation of mixed off-gas at relatively high pressure is described in British Pats. Nos. 1,173,195 and 952,764; Canadian Pat. No. 835,425; Hydrocarbon Processing, issues for April 1969, pages 117–121 and August 1970, pages 111–112; Nitrogen No. *63* issue for January/February 1970, pages 32–33, and Petrochemical Engineering (Japan), vol 2, No. 4 (1970), pages 49–52.

SUMMARY OF THE INVENTION

In the present invention, a first mixed off-gas is removed from the urea synthesis effluent melt at relatively high pressure in the range of 65 to 135 kg./sq. cm., with the first off-gas being generated solely by pressure reduction from the urea synthesis pressure. The residual liguid phase is preferably cooled to provide a reflux cooling effect and is then distilled at the relatively high pressure of 65 to 135 kg./sq. cm., to generate a second mixed off-gas of low water vapor content. The first and second mixed off-gases are combined and condensed at high pressure in heat exchange with water, which is vaporized to produce usable low pressure steam. The condensed aqueous ammoniacal ammonium carbamate solution is recycled to urea synthesis. The residual liquid phase after distillation, which contains product urea, is further distilled at reduced pressure in one or more stages to produce further mixed off-gas and product aqueous urea solution. The further mixed off-gas is cooled and condensed, and the condensate is pressurized and recycled to urea synthesis, either by addition to the high pressure condensate or by addition to the combined high pressure mixed off-gas.

The process of the present invention has several advantages. The overall consumption of utilities is sharply reduced. Thermal efficiency is about 82% compared to the 18% to 28% of conventional processes. Less water is recycled to the urea synthesis autoclave, and consequently overall conversion in the urea synthesis reaction is increased.

It is an object of the present invention to provide an improved process for urea synthesis.

Another object is to provide an improved process for recycle of unconverted components in urea synthesis.

A further object is to provide a urea synthesis process with recycle of mixed off-gas in which steam is generated by indirect heat exchange with condensing mixed off-gas.

An additional object is to provide a liquid recycle urea synthesis process in which a reduced amount of water is recycled to the high pressure synthesis autoclave, thereby attaining a higher conversion rate in urea synthesis.

These and other objects and advantages of the present invention will become evident from the description which follows:

DESCRIPTION OF THE DRAWINGS AND PREFERRED EMBODIMENTS

Figure 2:
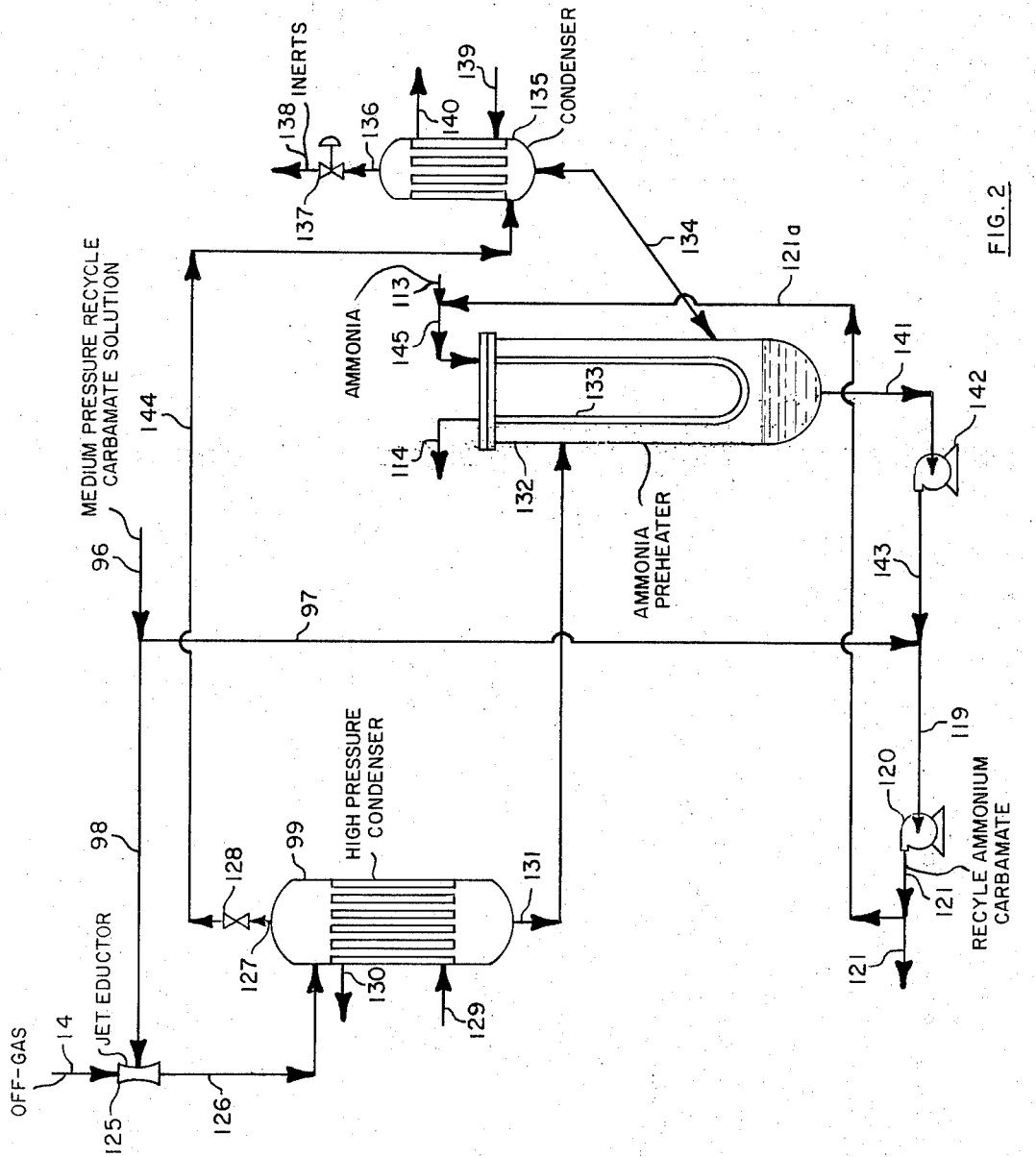

Referring now to the drawings, FIG. 1 is a flowsheet of a preferred embodiment of the invention, and FIG. 2 shows an alternative embodiment of the invention.

Referring to FIG. 1, urea synthesis autoclave or reactor 1 is provided for high pressure synthesis of urea from ammonia, carbon dioxide and recycled ammonium carbamate solution, which generally takes place at a pressure in the range of 200 kg./sq. cm. to 300 kg./sq. cm. and a temperature in the range of 150° C. to 250° C. A cooling coil, not shown, may be provided in autoclave 1 to remove heat generated by the reaction, in the form of usable steam, or by heat exchange with a low pressure process stream to decompose ammonium carbamate. A synthesis autoclave effluent stream 2 is removed from unit 1, and stream 2 is a high temperature melt containing urea, unconverted ammonium carbamate, excess free ammonia and water. Stream 2 is passed through expansion valve 3, and the resulting process stream 4 discharged from valve 3 at a reduced pressure in the range of 65 kg./sq. cm. to 135 kg./sq. cm. is passed into gas-liquid separating vessel 5, in which evolved high pressure mixed off-gas containing ammonia, carbon dioxide and water vapor is separated from the residual liquid phase and removed via stream 6, which is procesed in accordance with the present invention as will appear infra.

The remaining aqueous liquid phase containing product urea is removed from vessel 5 via stream 7, which preferably passes through heat exchanger 8 for cooling prior to distillation. Stream 7 is initially at a temperature in the range of 135° C. to 235° C. and pressure in the range of 65 kg./sq. cm. to 135 kg./sq. cm., and stream 7 is preferably cooled to a lower final temperature which may be as much as 15 centigrade degrees lower than the initial temperature in unit 8. Boiler feed or condensate water stream 9 is passed into unit 8, and vaporized steam is removed via stream 10 for process usages in evaporation or the like. In other instances, stream 9 may consist of cooling water in which case stream 10 will be warmed cooling water, or stream 9 may consist of a process fluid which is warmed and/or vaporized in unit 8 to produce stream 10. In any case, the liquid process stream 7 is cooled in unit 8, and the resulting cooled process stream 11 which is typically at a temperature 15 centigrade degrees lower than stream 7 is discharged from unit 8. The function of process stream cooling in unit 8 is to provide a cold reflux effect when stream 11 is passed into distillation tower 12, and thereby produce less water in the overhead mixed off-gas stream 13 removed from tower 12 at high pressure and combined with stream 6 to form combined mixed off-gas stream 14 which is processed in accordance with the present invention.

Distillation tower 12 is provided with trays 15, which may consist of bubble cap, sieve or valve trays or the like. Trays 15 may alternatively be replaced by a bed of packing. The downflowing liquid phase in tower 12 is distilled and stripped on trays 15 by rising vapors and gas. The resulting liquid phase is collected on liquid retention baffle 16, and is removed via stream 17 which passes through decomposer-reboiler 18, in which the liquid phase is heated to decompose ammonium carbamate and evolve mixed vapor. The resulting vapor-liquid stream 19 is returned to unit 12 below baffle 16. The vaporous phase of stream 19 rises through baffle 16 and trays 15 to provide a stripping and rectification distillation effect, and the residual hot aqueous liquid phase is removed from the bottom of unit 12 via stream 20, which is typically at a temperature in the range of 150° C. to 220° C., or 5 to 25 centigrade degrees higher than the feed stream 11. Usually stream 20 will contain about 10% to 20% of the ammonium carbamate originally present in stream 4, with a major portion of decomposition and off-gas evolution being attained in units 5 and 12.

Stream 20 is now subjected to two further stages of mixed off-gas evolution and distillation at successively reduced pressure, to remove additional amounts of excess ammonia and ammonium carbamate and produce a product aqueous urea solution. Stream 20 passes through expansion valve 21, and the resulting stream 22 which is now at a reduced pressure below 65 kg./sq. cm. and typically at a pressure in the range of 10 kg./sq. cm. to 30 kg./sq. cm. flows into separating vessel 23. The evolved mixed off-gas phase is removed from unit 23 via stream 24, and the residual liquid phase stream 25, now at a temperature in the range of 120° C. to 180° C., passes from unit 23 into distillation-rectification column 26, from which generated mixed off-gas is removed via stream 27, which is combined with stream 24 to form mixed off-gas stream 28 at a pressure in the range of 10 kg./sq. cm. to 30 kg./sq. cm. The liquid phase in unit 26 flows downwards through stripping and rectification trays 29, and the liquid phase is collected below trays 29 on baffle 30, removed via stream 31, heated in decomposer-reboiler 32, and returned to unit 26 below baffle 30 as mixed vapor-liquid stream 33 at a temperature generally 10 to 40 centigrade degrees higher than stream 25. The vapor component of stream 33 rises through baffle 30 and trays 29 to provide a stripping-rectification or distillation effect.

The liquid phase of stream 33 is removed from the bottom of unit 26 via stream 34, which passes through pressure reducing valve 35 and is discharged as stream 36 at a reduced pressure typically in the range of 2 kg./sq. cm. to 8 kg./sq. cm. Stream 36 passes into separator vessel 37, from which the evolved mixed off-gas phase is removed via stream 38. The residual liquid phase is removed from unit 37 via stream 39, which is at a temperature in the range of 80° C. to 120° C. and which passes into distillation column 40 for further rectification and ammonium carbamate decomposition, and the resulting mixed off-gas stream 41 is removed from column 40 at a pressure in the range of 2 kg./sq. cm. to 8 kg./sq. cm. and combined with stream 38 to form stream 42, which is processed in accordance with the present invention, as will appear infra.

The liquid phase in column 40 flows downwards through trays 43, and is stripped and rectified. The downflowing liquid phase collects on liquid retention baffle 44, and is removed via stream 45 which passes through decomposer-reboiler 46, in which the liquid phase is heated to decompose ammonium carbamate and evolve mixed vapor. The resulting vapor-liquid stream 47, now at a temperature generally 10 to 40 centigrade degrees higher than stream 39 is returned to unit 40 below baffle 44, and the vapor phase of stream 47 rises through baffle 44 and trays 43. The liquid phase of stream 47 collects in the bottom of unit 40 and is removed via stream 48, which now consists essentially of an aqueous urea solution containing only a very minor residual proportion of other components such as ammonia.

Stream 48 may be directly passed to product utilization, however stream 48 is preferably subjected to further heating and degassing at a pressure below 1 kg./sq. cm., with the sub-atmospheric degassing serving to remove and recover minor proportions of ammonia present in stream 48. In this case, stream 48 is passed through pressure reducing valve 49, and the resulting stream 50, now at a sub-atmospheric pressure below 1 kg./sq. cm., is passed through heater-concentrator 51 for indirect heat exchange with reacting process streams which serve to heat stream 50, so that the resulting stream 52 discharged from unit 51 is at a temperature typically in the range of 80° C. to 120° C. and generally contains an evolved vapor component containing residual ammonia.

Stream 52 is passed into separator vessel 53 for removal of evolved vapor, and the residual liquid phase consisting essentially of aqueous urea solution is withdrawn via stream 54 and passed to product utilization which may include concentration by evaporation followed by crystallization or prilling to produce product solid urea, or other processing well known to those skilled in the art, to produce product urea solution or solid urea.

The vapor component rich in ammonia which is evolved in unit 53 is removed via stream 55, which is drawn into condenser 56 at a temperature generally in the range of 80° C. to 120° C. and pressure below 1 kg./sq. cm. absolute. Cooling water is circulated through condenser 56, so as to maintain an internal temperature generally in the range of 30° C. to 70° C. within unit 56, and a major portion or all of stream 55 is condensed to liquid within unit 56. Residual vapor is removed from unit 56, and a vacuum effect is mantained, by the provision of stream 57 which extends to steam jet ejector 58. High pressure steam stream 59 passes through unit 58 so as to generate a vacuum, and exhaust steam is removed via stream 60.

The liquid phase rich in ammonia which is condensed in unit 56 is removed via stream 61 which is pressurized by a pump or the like and is divided into bypass stream 62 and stripper feed stream 63, which is combined with hotwell solution stream 64 derived from crystallization or the like. Stream 64 is a very dilute aqueous solution containing dissolved ammonia which must be recovered to prevent ammonia loss. The combining of streams 63 and 64 produces stream 65, which is heated in heat exchanger 66 to a temperature typically in the range of 110° C. to 150° C. The resultant heated aqueous solution stream 67 discharged from unit 66 is passed into the upper section of ammonia recovery stripper 68, which is provided with internal trays, packing or plates to attain vapor-liquid contact. Stripping steam stream 69 is passed into the lower end of unit 68, and rises through the column 68, so as to effectively strip ammonia from the downflowing liquid phase at a pressure typically in the range of 2 kg./sq. cm. to 8 kg./sq. cm. A temperature generally in the range of 120° C. to 170° C. is maintained in the lower section of unit 68 by the injection of steam and/or carbon dioxide stream 69, and under these conditions substantially all of the ammonia is stripped from the liquid phase, so that liquid stream 70 withdrawn from the bottom of unit 68 consists essentially of hot water, which is passed through unit 66 for cooling and heat recovery by indirect heat exchange with stream 65, followed by discharge of the cooled water to a sewer or the like via stream 71.

An ammonia-rich gaseous or vaporous stream 72 is withdrawn from the upper end of unit 68, and stream 72 is preferably combined with aqueous urea stream 73, which may also contain biuret and is preferably derived as mother liquor from urea crystallization or the like. The combination of streams 72 and 73 forms stream 74, which is combined with stream 62 to form the mixed gas-liquid stream 75, which is passed together with stream 42 into cooler-condenser 76, in which the gaseous or vaporous component is condensed to liquid by indirect heat exchange with cooling water or the like. The resulting liquid stream 77 discharged from unit 76 is an aqueous solution containing dissolved urea, ammonia and carbon dioxide, and stream 77 is typically at a temperature in the range of 30° C. to 70° C. and pressure in the range of 2 kg./sq. cm. to 8 kg./sq. cm.

Stream 77 is pressurized by pump 78, and the resulting stream 79 is discharged at a pressure typically in the range of 10 kg./sq. cm. to 30 kg./sq. cm. Stream 79 is now combined and reacted with off-gas stream 28 in the shell of unit 51, with the resultant formation and absorption of ammonium carbamate into the liquid phase, which generates heat and thereby heat stream 50 flowing through the tubes of unit 51. The combined gas-liquid stream 80 formed by the combination of streams 79 and 28, and discharged from the shell of unit 51, flows to an indirect heat exchanger unit 81, and is further cooled by heat exchange with process stream 82 which may consist of liquor or aqueous urea solution or urea slurry from a crystallization section. The warmed process fluid stream 83 is passed to further process usage as desred, such as to a vacuum crytallization unit when stream 82 is aqueous urea solution.

The cooled process stream 84 discharged from the unit 81 is now at a temperature typically in the range of 40° C. to 100° C., and contains a residual vapor phase. Substantially all of the vapor phase in stream 84 is now condensed by passing stream 84 into the lower section of medium pressure condenser 85, so that the vapor phase rising through the tubes of unit 85 is condensed and flows downwards through the tubes, with vapor condensation being facilitated by spraying recycle liquid stream 86 into the upper end of unit 85. A residual gaseous component consisting primarily of inerts, such as nitrogen and hydrogen derived from the ammonia feed stream introduced into the system via autoclave 1 or inerts derived from feed carbon dioxide, is continuously or periodically discharged from the system via stream 87 and bleed or purge valve 88. Cooling water stream 89 is passed into the shell of unit 85 and circulates external to the tubes to provide a cooling effect for vapor condensation in the tubes, and warmed cooling water is removed via stream 90. Unit 85 may alternatively be operated with flow of stream 84 to the shell and stream 89 through the tubes.

The resulting medium pressure condensate formed in unit 85, consisting essentially of an aqueous ammoniacal ammonium carbamate solution which may contain a minor proportion of dissolved urea, is removed from unit 85 via stream 91, which is pressurized by pump 92 to an elevated pressure generally in the range of 65 kg./sq. cm. to 135 kg./sq. cm. The high pressure liquid stream 93 discharged from pump 92 is divided with a small recycle stream 94 flowing through letdown valve 95 for recycle via stream 86 to unit 85. The balance of stream 93 flows via stream 96 to high pressure off-gas condensation and ammonium carbamate recycle, with stream 96 being divided into bypass stream 97 and stream 98, which flows into the lower portion of high pressure condenser 99 together with off-gas stream 14. A gaseous phase containing ammonia, carbon dioxide, water vapor and inerts rises through the tubes of unit 99 and selective condensation of vaporous components takes place, with the resultant generation of low pressure stream by indirect heat exchange with water, as will appear infra.

The high pressure liquid condensate formed in unit 99 is withdrawn from the lower portion of unit 99 via stream 100, which is divided into recycle aqueous ammonium carbamate stream 101 and recycle stream 102, which is returned into the upper portion of unit 99, so that liquid stream 102 flows downwards through the tubes of unit 99 and aids in vapor condensation. A residual gaseous stream consisting mostly of inerts such as nitrogen and hydrogen is withdrawn from the upper end of unit 99 via stream 103, which flows through the tubes of refrigerated heat exchanger 104 for final vapor condensation, with condensate returning to unit 99. A final cold inerts stream 105 is continuously or intermittently withdrawn from unit 104 and passed via bleed or purge valve 106 to discharge via stream 107.

As mentioned supra, the operation of high pressure condenser 99 serves to generate usable low pressure steam. Condensate or boiler feed water stream 108 is passed into the shell of unit 99 external to the vertically oriented tubes, and the water is vaporized by heat exchange with condensing vapor within the tubes, so that steam stream 109 is withdrawn from the upper shell of unit 99 at a pressure typically in the range of 2 kg./sq. cm. to 10 kg./sq. cm. Stream 109 is saturated stream which may contain an entrained liquid phase, and stream 109 is passed into vapor-liquid separator 110, together with make-up boiler feed or condensate water stream 111. Usable saturated steam stream 112 is withdrawn from unit 110 and passed to process usages such as in condensing steam turbines, or as a heating medium for evaporation of aqueous urea solution, or in units 18, 32 or 46, or the like. Unit 99 may alternatively be operated with flow of streams 14 and 98 to the shell and stream 108 through the tubes.

Returning to unit 104, cold liquid ammonia feed stream 113 is passed into the shell of unit 104 to provide a cooling and refrigeration effect for condensation of residual vapor within the tubes of unit 104. The resulting warmed liquid ammonia steam, now at a temperature typically in the range of 30° C. to 150° C., is passed to pressurizing pump 115 and is pressurized to urea synthesis pressure and passed via stream 116 to urea synthesis in autoclave 1.

The by-pass pressurized condensate stream 97 which by-passes unit 99 is passed through control valve 117, and flows via stream 118 and is combined with stream 101, to form the aqueous ammoniacal ammonium carbamate recycle stream 119, which is pressurized to urea synthesis pressure by ammonium carbamate recycle pump 120, which passes the aqueous ammonium carbamate solution via stream 121 to the urea synthesis autoclave 1.

Carbon dioxide feed stream 122 is compressed or pressurized by compressor 123 to urea synthesis pressure and passed via stream 124 to urea synthesis autoclave 1. The combined streams 116, 121 and 124 react in unit 1 under urea synthesis conditions of elevated temperature and pressure to produce stream 2. A cooling coil, not shown, may be provided within unit 1 to moderate the highly exothermic ammonium carbamate formation reaction between ammonia and carbon dioxide, and produce low pressure steam. In other instances, streams 17, 31 or 45 may be passed through a coil or coils within unit 1 to attain heating and decomposition of ammonium carbamate.

Referring now to FIG. 2, in which streams comparable to those of FIG. 1 are provided with the same numerals, an alternative arrangement of the steam-generating condenser with improved heat recovery is illustrated. The pressurized condensate stream 96 is divided into stream 97 and stream 98, with stream 98 being mixed into the high pressure off-gas stream 14 by means of jet eductor or mixer 125. The resulting mixed gas-liquid stream 126 discharged from unit 125 is passed into the upper end of high pressure condenser 99, and downflowing vapor within the tubes of unit 99 is partially condensed at a temperature typically in the range of 120° C. to 200° C. by indirect heat exchange with water circulating external to the vertically oriented tubes of unit 99. In other instances, stream 126 may be passed into the lower end of unit 99. Inerts rise from the top of unit 99 via stream 127 for continuous bleed or intermittent purge via valves 128, for further processing as will appear infra. Condensate or boiler feed water stream 129 is passed into the shell of unit 99 external to the vertical tubes, and generated steam is removed via stream 130 at a pressure typically in the range of 2 kg./sq. cm. to 10 kg./sk. cm. Unit 99 may alternatively be operated with flow of stream 126 in the shell and stream 129 through the tubes.

A mixed vapor-liquid stream 131 is removed from the lower end of unit 99 and passed to ammonia preheater 132, which is a vertically oriented high pressure vessel provided with an internal heat exchange coil 133, through which cold feed fluid consisting mostly of liquid ammonia is circulated prior to urea synthesis, as will appear infra. The circulation of cold fluid, generally liquid, within coil 133 serves to condense most of the residual vapor phase of stream 131 at a temperature typically in the range of 100° C. to 175° C. Residual vapor is removed from unit 132 via reflux stream 134, which passes vapor to vent condenser-heat exchanger 135 for final condensation of vaporous components, which return to unit 132 as liquid via line 134. Residual non-condensable and inert components such as nitrogen and hydrogen rise from unit 135 via stream 136, which is intermittently purged or continuously bled from the system via valve 137 as stream 138, which may be discharged to atmosphere. An elevated pressure generally within the range of 65 kg./sq. cm. to 135 kg./sq. cm. is maintained within unit 135, and a temperature typically in the range of 30° C. to 60° C. is maintained within the vertical vapor condensation tubes of unit 135 by the circulation of cooling water stream 139 external to the tubes, with warmed cooling water being removed via stream 140.

Returning to unit 132, a condensed aqueous solution consisting essentially of an ammoniacal ammonium carbamate solution which may contain a small proportion of dissolved urea is removed from the lower end of unit 132 via stream 141, which is pumped via high pressure condensate pump 142 as stream 143 and combined with stream 97 to form stream 119, which is pressurized by ammonium carbamate recycle pump 120 to urea synthesis pressure, and passed via stream 121 to urea synthesis. Alternatively, all or a portion of stream 121 may be passed via stream 121a for combination with ammonia feed stream 113, which is passed via stream 145 through coil 133 and then passed via stream 114 to pressurizing prior to passage to urea synthesis, as described supra. Returning to unit 99, stream 127 may be purged or bled via valve 128 to atmosphere, however in most cases ammonia recovery from stream 127 will be attained by passing the effluent from valve 128 via stream 144 to the vent condenser 135. In this case, stream 139 passed through the shell of unit 135 may consist of cold liquid ammonia.

Numerous alternatives within the scope of the present invention will occur to those skilled in the art. Thus a small amount of carbon dioxide may be injected into units 40, 68 and/or 76, to assist in the procedural sequences carried out in these process units.

An example of an industrial application of the process of the present invention will now be described.

EXAMPLE

The process of the present invention was applied to a 1000 tons/day urea plant. Following are pertinent operating conditions for principal process streams.

| Stream number | Temp., °C. | Pressure, kg./sq. cm. | Flow rate of stream component, tons/hr. | | | | |
|---|---|---|---|---|---|---|---|
| | | | Urea | Water | Ammonia | Carbon dioxide | Inerts |
| 2 | 194 | 230 | 44.6 | 25.8 | 46.7 | 17.1 | 0.27 |
| 6 | 176 | 78 | | 1.1 | 6.1 | 2.0 | 0.27 |
| 11 | 170 | 78 | 44.6 | 24.7 | 40.6 | 15.1 | |
| 13 | 170 | 78 | | 1.2 | 15.3 | 13.0 | |
| 14 | 171 | 78 | | 2.3 | 21.4 | 15.0 | 0.27 |
| 20 | 183 | 78 | 44.6 | 23.5 | 25.3 | 2.1 | |
| 24 | 138 | 21 | | 1.2 | 10.7 | 1.2 | |
| 25 | 138 | 21 | 44.6 | 22.3 | 14.6 | 0.9 | |
| 27 | 138 | 21 | | 0.7 | 6.4 | 0.6 | |
| 28 | 138 | 21 | | 1.9 | 17.1 | 1.8 | |
| 34 | 159 | 21 | 44.6 | 21.6 | 8.2 | 0.3 | |
| 38 | 104 | 3.8 | | 1.6 | 5.6 | 0.2 | |
| 39 | 104 | 3.8 | 44.6 | 20.0 | 2.6 | 0.14 | |
| 41 | 104 | 3.8 | | 0.5 | 1.7 | 0.06 | |
| 42 | 104 | 3.8 | | 2.1 | 7.3 | 0.26 | |
| 48 | 131 | 3.8 | 44.6 | 19.5 | 0.96 | 0.08 | |
| 54 | 97 | 0.47 | 44.6 | 13.9 | 0.12 | 0.06 | |
| 55 | 97 | 0.47 | | 5.6 | 0.84 | 0.02 | |
| 61 | 40 | 0.46 | | 5.6 | 0.84 | 0.02 | |
| 62 | 40 | 3.8 | | 5.1 | 0.77 | 0.018 | |
| 63 | 40 | 3.8 | | 0.5 | 0.07 | 0.002 | |
| 64 | 38 | 3.8 | | 15.3 | 0.19 | 0.155 | |
| 67 | 130 | 3.8 | | 15.8 | 0.26 | 0.157 | |
| 71 | 51 | 3.8 | | 16.6 | | | |
| 72 | 130 | 3.8 | | 0.8 | 0.26 | 0.155 | |
| 73 | 66 | 3.8 | 2.4 | 0.7 | | | |
| 77 | 40 | 3.5 | 2.4 | 8.7 | 8.3 | 0.43 | |
| 80 | 102 | 20 | 2.4 | 10.6 | 25.4 | 2.2 | |
| 84 | 84 | 20 | 2.4 | 10.6 | 25.4 | 2.2 | |
| 96 | 60 | 78 | 2.4 | 10.6 | 25.4 | 2.2 | |
| 105 | 60 | 78 | | | 0.16 | | 0.27 |
| 113 | 32 | 20 | | | 0.1 | 23.9 | |
| 119 | 154 | 78 | 2.4 | 12.9 | 46.8 | 17.2 | |
| 122 | 38 | 1 | | | | 30.9 | 0.27 |
| 131 | 154 | 78 | 0.24 | 3.3 | 23.9 | 15.2 | |
| 136 | 54 | 78 | | | 0.12 | | 0.27 |
| 143 | 120 | 78 | 0.24 | 3.6 | 23.8 | 15.2 | |
| 144 | 95 | 78 | 2.4 | 13.2 | 46.6 | 17.2 | |

Heat transfer rates were calculated to be as follows:

| Unit No.: | 1,000 Kcal. transfer per hour |
|---|---|
| 1 | 4849 |
| 8 | 703 |
| 18 | 11650 |
| 32 | 4195 |
| 46 | 2255 |
| 51 | 1883 |
| 56 | 3353 |
| 66 | 1497 |
| 76 | 5857 |
| 81 | 4315 |
| 85 | 2982 |
| 99 | 8810 |
| 104 | 524 |
| 132 | 4186 |
| 135 | 1374 |

We claim:

1. A process for urea synthesis which comprises reacting feed streams of ammonia and carbon dioxide with a recycle ammonium carbamate stream at a pressure in the range of 200 kg./sq. cm. to 300 kg./sq. cm. to form a urea synthesis effluent stream principally containing urea, ammonium carbamate, ammonia and water, reducing the pressure of said effluent stream to an intermediate pressure in the range of 65 kg./sq. cm. to 135 kg./sq. cm., whereby a first mixed off-gas stream is evolved, separating said first mixed off-gas stream from the remaining liquid phase, cooling said remaining liquid phase, distilling the cooled remaining liquid phase to evolve a second mixed off-gas stream, separating said second mixed off-gas stream from the residual liquid phase, combining said first and second mixed off-gas streams to form a combined off-gas stream, cooling said combined off-gas stream at a pressure in the range of 65 kg./sq. cm. to 135 kg./cm. to condense substantially all of the gas phase to liquid and thereby form a first liquid condensate, said combined off-gas stream being cooled in contact with a circulating stream of first liquid condensate, reducing the pressure of said residual liquid phase to a final reduced level below 65 kg./sq. cm., removing a third mixed off-gas stream from the liquid phase at reduced pressure, whereby a final liquid phase consisting essentially of aqueous urea solution is produced, cooling said third mixed off-gas stream to condense substantially all of the gas phase to liquid and thereby form a second liquid condensate, said third mixed off-gas stream being cooled in contact with a circulating stream of second liquid condensate, pressurizing at least a portion of said second liquid condensate to a pressure in the range of 65 kg./sq. cm. to 135 kg./sq. cm., adding the pressurized second liquid condensate to said first liquid condensate to form a combined condensate stream, and pressurizing at least a portion of said combined condensate stream to form said recycle ammonium carbamate stream.

2. The process of Claim 1, in which at least a portion of said pressurized second liquid condensate is added to said circulating stream of first liquid condensate.

3. The process of Claim 1, in which the pressure of said residual liquid phase is reduced to a final reduced level below 65 kg./sq. cm. in first and second stages of successively decreased pressure, with mixed off-gas portions being removed from the liquid phase at each lower pressure stage, the mixed off-gas portion removed from the second stage of lowest pressure is cooled and condensed to liquid, the resulting liquid condensate is pressurized, the pressurized liquid condensate is added to the mixed off-gas portion removed from the first stage of higher pressure to form a mixed gas-liquid stream, and the mixed gas-liquid stream is cooled to condense the gaseous phase and form said second liquid condensate.

4. The process of Claim 3, in which said mixed gas-liquid stream is cooled in at least two stages, the initial stage of cooling is by indirect heat exchange with an aqueous process stream, whereby said aqueous process stream is heated, and the final stage of cooling is by indirect heat exchange with cooling water.

5. The process of Claim 3, in which an aqueous process stream is added to the mixed off-gas portion removed from the second stage of lowest pressure, and the resulting gas-liquid mixture is cooled to form said resulting liquid condensate.

6. The process of Claim 5, in which at least a portion of said aqueous process stream is aqueous urea solution derived as mother liquor from urea crystallization.

7. The process of Claim 5, in which at least a portion of said aqueous process stream is flash gas condensate derived from vacuum evaporation of a portion of said final liquid phase consisting essentially of aqueous urea solution at an absolute pressure below atmospheric pressure, and cooling of the resulting evolved flash gas phase to form flash gas condensate.

8. The process of Claim 5, in which carbon dioxide is added to said resulting gas-liquid mixture.

9. The process of Claim 1, in which said third mixed off-gas stream is removed from said liquid phase at reduced pressure by steps including distillation, in which carbon dioxide is added to said liquid phase during said distillation.

10. The process of Claim 1, in which said combined off-gas stream is cooled, to condense substantially all of the gas phase to liquid and form said first liquid condensate, by indirect heat exchange with liquid water, whereby said liquid water is vaporized to form steam.

11. The process of Claim 1, in which said first and second mixed off-gas streams are initially cooled by indirect heat exchange with liquid water, whereby said liquid water is vaporized to form low pressure steam, and the resulting partially cooled and condensed stream is further cooled, to condense substantially all of the gas phase to liquid and form said first liquid condensate, by indirect heat exchange with liquid ammonia, whereby said liquid ammonia is warmed prior to passing said liquid ammonia to the urea synthesis reaction as said ammonia feed stream.

12. The process of Claim 4, in which said aqueous process stream is said final liquid phase consisting essentially of aqueous urea solution.

13. The process of Claim 4, in which said aqueous process stream consists essentially of aqueous urea solution derived from a vacuum urea crystallization facility.

References Cited

UNITED STATES PATENTS 3,531,521    9/1970    Nobuo et al. _____ 260—555

FOREIGN PATENTS 952,764    3/1964    Great Britain _____ 260—555

LEON ZITVER, Primary Examiner

A. SIEGEL, Assistant Examiner